US011625205B2

(12) United States Patent
Kikuchi

(10) Patent No.: US 11,625,205 B2
(45) Date of Patent: Apr. 11, 2023

(54) INFORMATION PROCESSING APPARATUS, SERVER APPARATUS, CONTROL METHOD, AND STORAGE MEDIUM

(71) Applicant: CANON KABUSHIKI KAISHA, Tokyo (JP)

(72) Inventor: Hiroshi Kikuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/328,424

(22) Filed: May 24, 2021

(65) Prior Publication Data

US 2021/0279016 A1   Sep. 9, 2021

Related U.S. Application Data

(63) Continuation of application No. PCT/JP2019/044805, filed on Nov. 15, 2019.

(30) Foreign Application Priority Data

Nov. 30, 2018 (JP) .............................. JP2018-225490

(51) Int. Cl.
*G06F 3/12* (2006.01)

(52) U.S. Cl.
CPC ............ *G06F 3/1225* (2013.01); *G06F 3/123* (2013.01); *G06F 3/1205* (2013.01); *G06F 3/1285* (2013.01)

(58) Field of Classification Search
CPC combination set(s) only.
See application file for complete search history.

(56) References Cited

U.S. PATENT DOCUMENTS

| 2005/0057763 | A1* | 3/2005 | Suzuki | G06T 3/403 |
| | | | | 358/1.9 |
| 2012/0069366 | A1 | 3/2012 | Heffner | |
| 2013/0063776 | A1* | 3/2013 | Kishida | G06F 3/1228 |
| | | | | 358/1.15 |
| 2013/0155464 | A1* | 6/2013 | Bearchell | G06F 3/1285 |
| | | | | 358/1.15 |
| 2013/0176584 | A1* | 7/2013 | Takashima | G06F 3/1204 |
| | | | | 358/1.13 |
| 2014/0071474 | A1* | 3/2014 | Uchida | G06F 3/1225 |
| | | | | 358/1.13 |
| 2014/0233050 | A1* | 8/2014 | Kishida | G06F 3/1204 |
| | | | | 358/1.13 |

(Continued)

FOREIGN PATENT DOCUMENTS

| JP | 2004-151816 A | 5/2004 |
| JP | 2004 265061 A | 9/2004 |

(Continued)

OTHER PUBLICATIONS

Kennedy et al.; "IPP Implementor's Guide v2.0 (IG)"; The Printer Working Group; https://ftp.pwg.org/pub/pwg/candidates/cs-ippig20-20150821-5100.19.pdf, Aug. 21, 2015.

*Primary Examiner* — Helen Zong
(74) *Attorney, Agent, or Firm* — Canon U.S.A., Inc. IP Division

(57) ABSTRACT

A print expansion application is downloaded by using, as a key, a printer Hardware Identifier (HWID) acquired when a printer driver to be commonly used in an operating system (OS) is installed, and the print expansion application is associated with the printer driver.

16 Claims, 14 Drawing Sheets

(56) References Cited

U.S. PATENT DOCUMENTS

2020/0159466 A1* 5/2020 Mosko .................... G06F 3/126
2020/0310701 A1* 10/2020 Kai ......................... G06F 3/129

FOREIGN PATENT DOCUMENTS

| JP | 2006-260356 A | 9/2006 |
| JP | 2014-219736 A | 11/2014 |
| JP | 2015-135658 A | 7/2015 |
| JP | 2017-027322 A | 2/2017 |

* cited by examiner

FIG.10

CORRESPONDENCE TABLE OF PRINTER
HWID AND PRINT EXPANSION APPLICATION

| PRINTER HWID (1001) | PRINT EXPANSION APPLICATION NAME (1002) | APPLICATION IDENTIFIER (AppID) (1003) |
|---|---|---|
| PrinterAAA | Print App AAA | AAA01 |
| PrinterBBB | Print App BBB | BBB01 |
| MFPAAA | MFP Utility AAA | QQQ01 |
| MFPBBB | MFP Utility BBB | RRR01 |

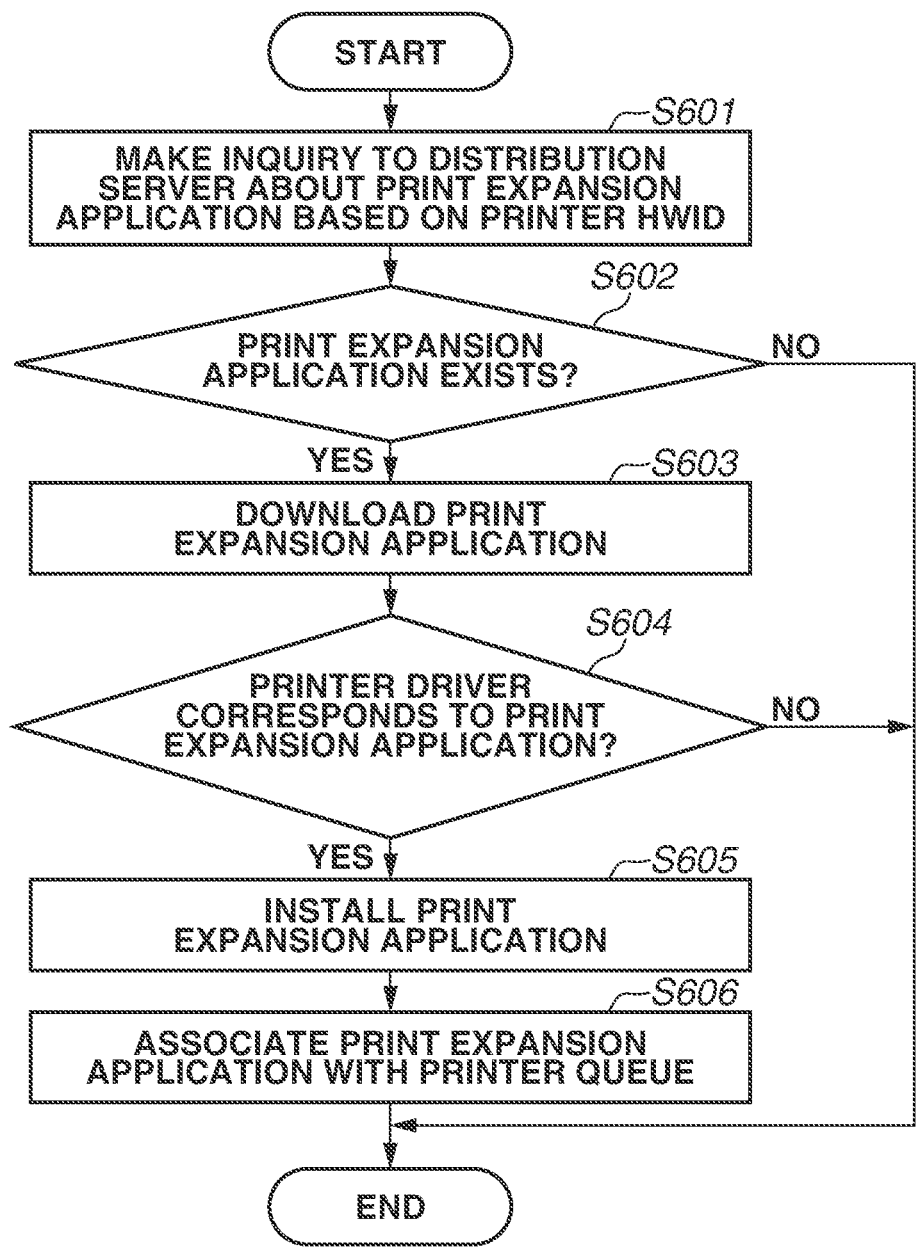

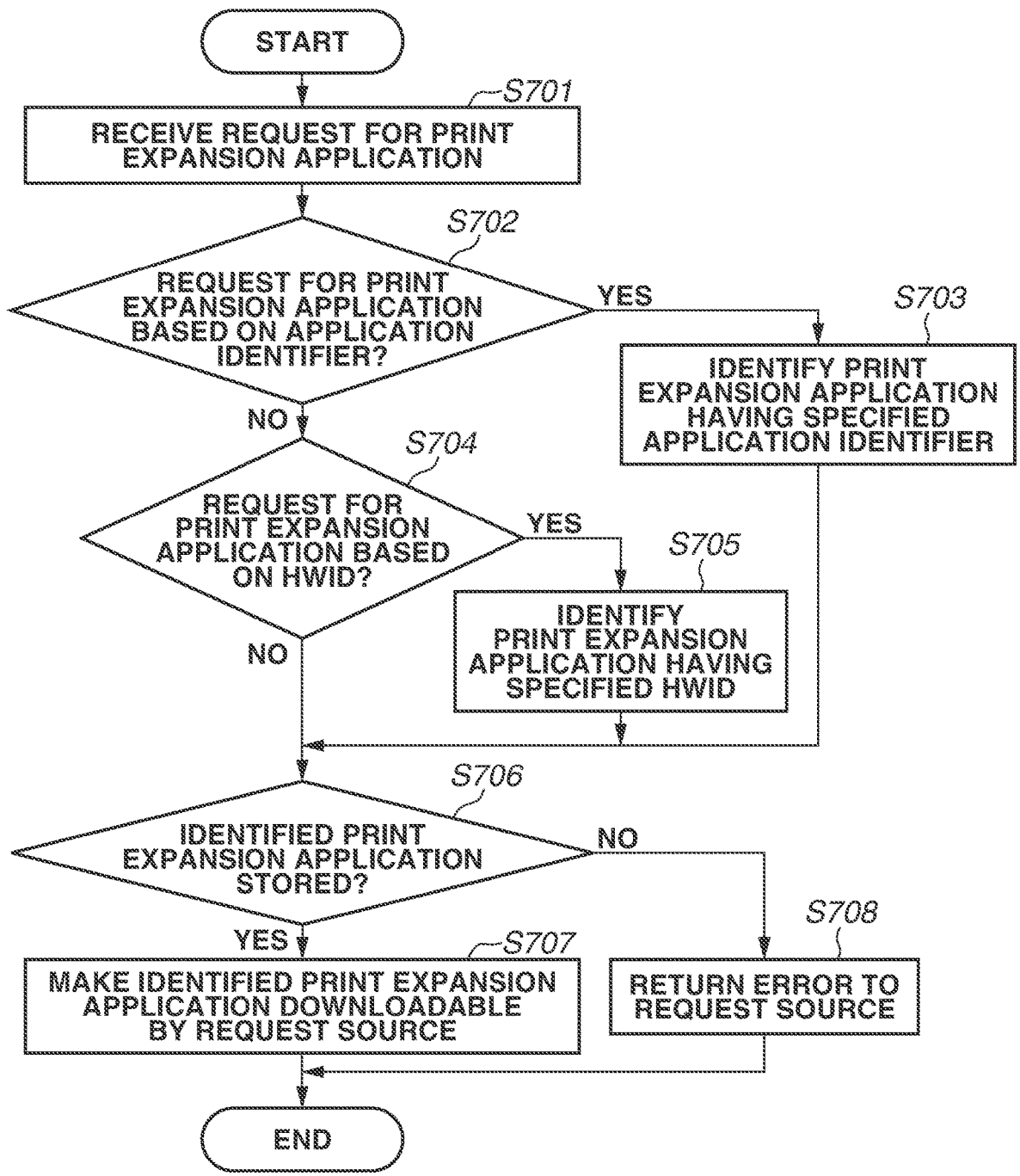

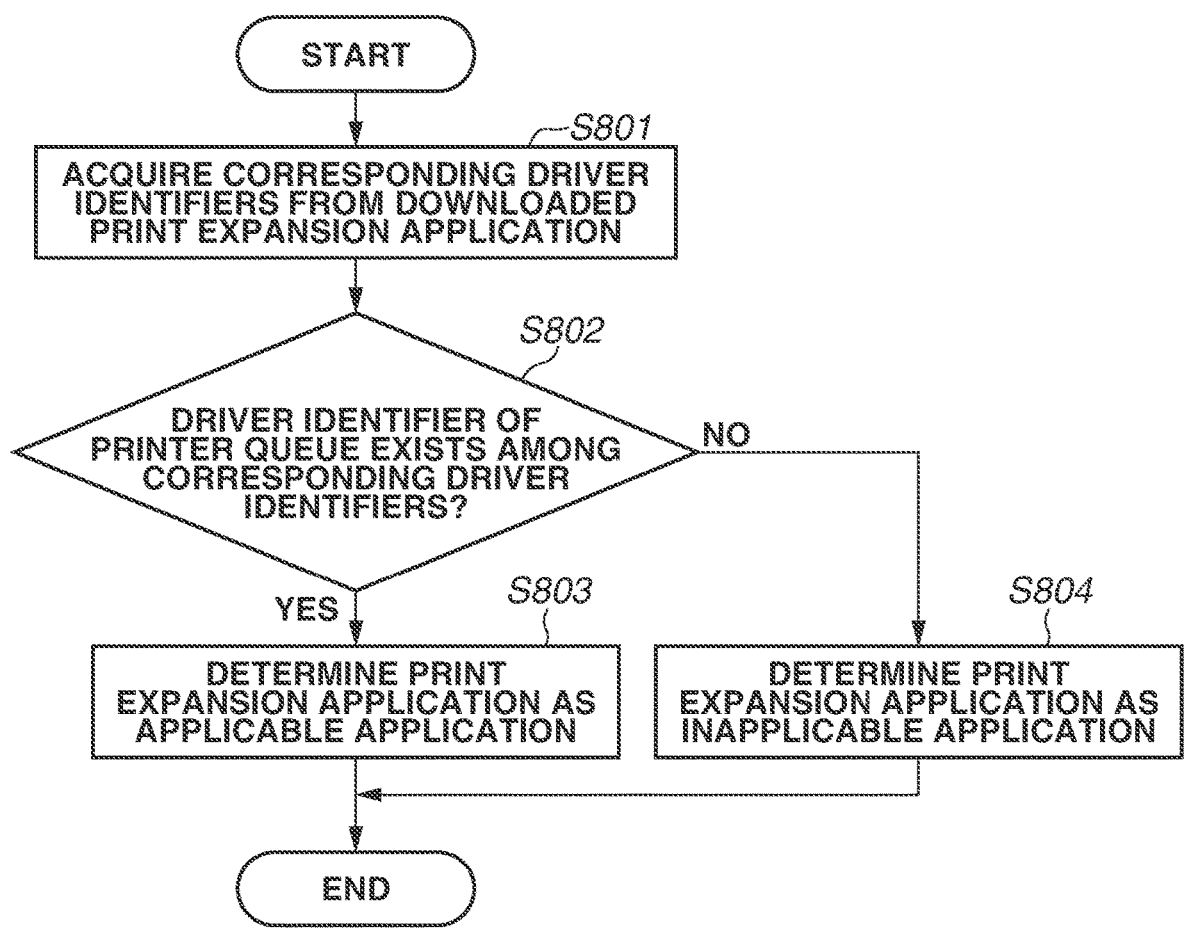

INFORMATION PROCESSING APPARATUS, SERVER APPARATUS, CONTROL METHOD, AND STORAGE MEDIUM

CROSS-REFERENCE TO RELATED APPLICATIONS

This application is a Continuation of International Patent Application No. PCT/JP2019/044805, filed Nov. 15, 2019, which claims the benefit of Japanese Patent Application No. 2018-225490, filed Nov. 30, 2018, both of which are hereby incorporated by reference herein in their entirety.

BACKGROUND OF THE INVENTION

Field of the Invention

The present invention relates to an information processing apparatus that communicates with an image forming apparatus, and a server apparatus.

Background Art

A configuration is known in which print data is transmitted to a printing apparatus by using a printer driver. The printer driver is configured based on specifications prescribed by an operating system (OS) installed in a host computer. The printer driver operates when called by the OS. A printing apparatus vendor provides a printer driver appropriate for a printing apparatus conforming to the specifications of the OS, thus offering a means for instructing a printer to perform printing by using the OS. A printer driver called a universal printer driver is known to control a plurality of types of printing apparatuses having different functions (Patent Literature 1).

A universal printer driver as disclosed in Patent Literature 1 is offered for each printing apparatus vendor. However, it has been difficult to support printing apparatuses of different printing apparatus vendors by using one universal printer driver.

In addition, possible methods for implementing a mechanism described above include use of what is called a common printer driver using a mechanism conforming to Internet Printing Protocol (IPP) represented by the above-described IPP Everywhere (registered trademark) (Non-patent Literature 1).

CITATION LIST

Patent Literature

PTL 1: Japanese Patent Laid-Open No. 2015-135658

Non-Patent Literature

NPL 1: IPP Implementor's Guide v2.0 (IG) https://ftp.pwg.org/pub/pwg/candidates/cs-ippig20-20150821-5100.19.pdf An expansion application for a predetermined image forming apparatus is set up by associating the expansion application with a common printer driver. This enables considering a mechanism for flexibly expanding a function of the common printer driver and further utilizing a function of the image forming apparatus.

However, there has been considered no mechanism for expanding the common printer driver by setting up an expansion application at which timing or in which procedure on the client side.

SUMMARY OF THE INVENTION

According to an aspect of the present invention, an information processing apparatus communicable with a server apparatus and an image forming apparatus, a printer driver being installable in the information processing apparatus, includes a reception unit configured to receive identification information about the image forming apparatus, a transmission unit configured to transmit the identification information about the image forming apparatus received by the reception unit to the server apparatus, and an execution unit configured to execute processing of associating an expansion application transmitted from the server apparatus with the printer driver, the expansion application corresponding to the identification information about the image forming apparatus transmitted by the transmission unit.

Further features of the present invention will become apparent from the following description of exemplary embodiments with reference to the attached drawings.

BRIEF DESCRIPTION OF THE DRAWINGS

FIG. 10 illustrates a correspondence table of a printer Hardware Identifier (HWID) and a print expansion application.

FIG. 12 is a flowchart illustrating an association between a common printer driver and a print expansion application.

FIG. 13 is a flowchart illustrating processing performed by the expansion application distribution server.

FIG. 14 is a flowchart illustrating processing for determining whether a print expansion application is applicable to a printer queue.

DESCRIPTION OF THE EMBODIMENTS

Exemplary embodiments according to the present invention will be described below with reference to the drawings. Not all of the combinations of the features described in the following exemplary embodiments are indispensable to the solutions for the present invention.

First Exemplary Embodiment

Figure 1:
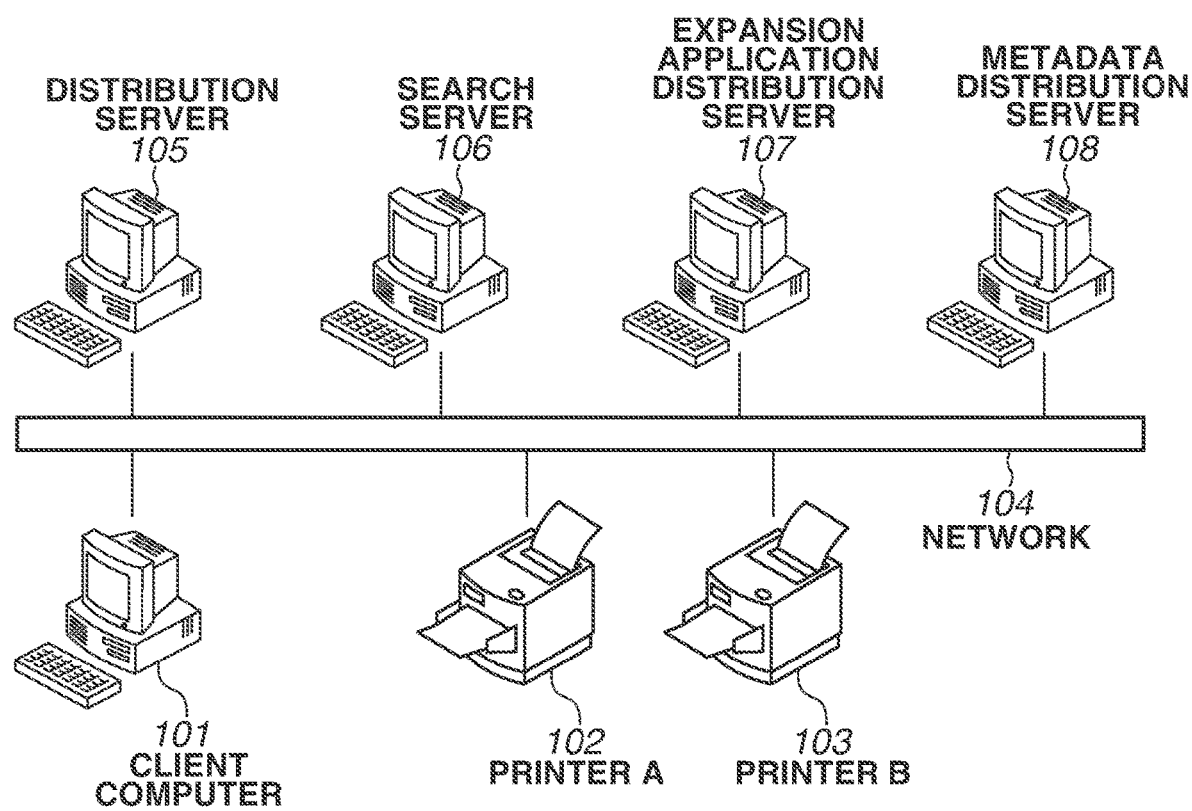
FIG. 1 is a diagram illustrating an example of a printing system according to a first exemplary embodiment.

A printing system according to the present invention will be described below with reference to FIG. 1. FIG. 1 illustrates an example of the printing system according to the present invention. The printing system according to the first exemplary embodiment includes a client computer 101, a printer A 102 and a printer B 103 that receive print data in a Page Description Language (PDL) format and perform printing, and various servers. Various servers include a distribution server 105 that distributes an expansion application, and a search server 106 that acquires a desired expansion application from the distribution server 105. Various servers further include an expansion application distribution server 107 that distributes a driver, and a metadata distribution server 108 that distributes a device management unit (hereinafter referred to as metadata) associated with the driver. These apparatuses are capable of communicating with each other via a network 104 including a Wide Area Network (WAN).

The printer A 102 and the printer B 103 may be single-function printers each having only a printing function, or multifunction printers each having a printing function, a scan function, and a copy function. Not only one client computer 101 but also a plurality of client computers 101 may be connected to the network 104. The client computer 101 can transmit print data to the printer A 102 or the like. A printer driver may be a scanner driver. A printer expansion application may be a scanner expansion application.

Figure 2:
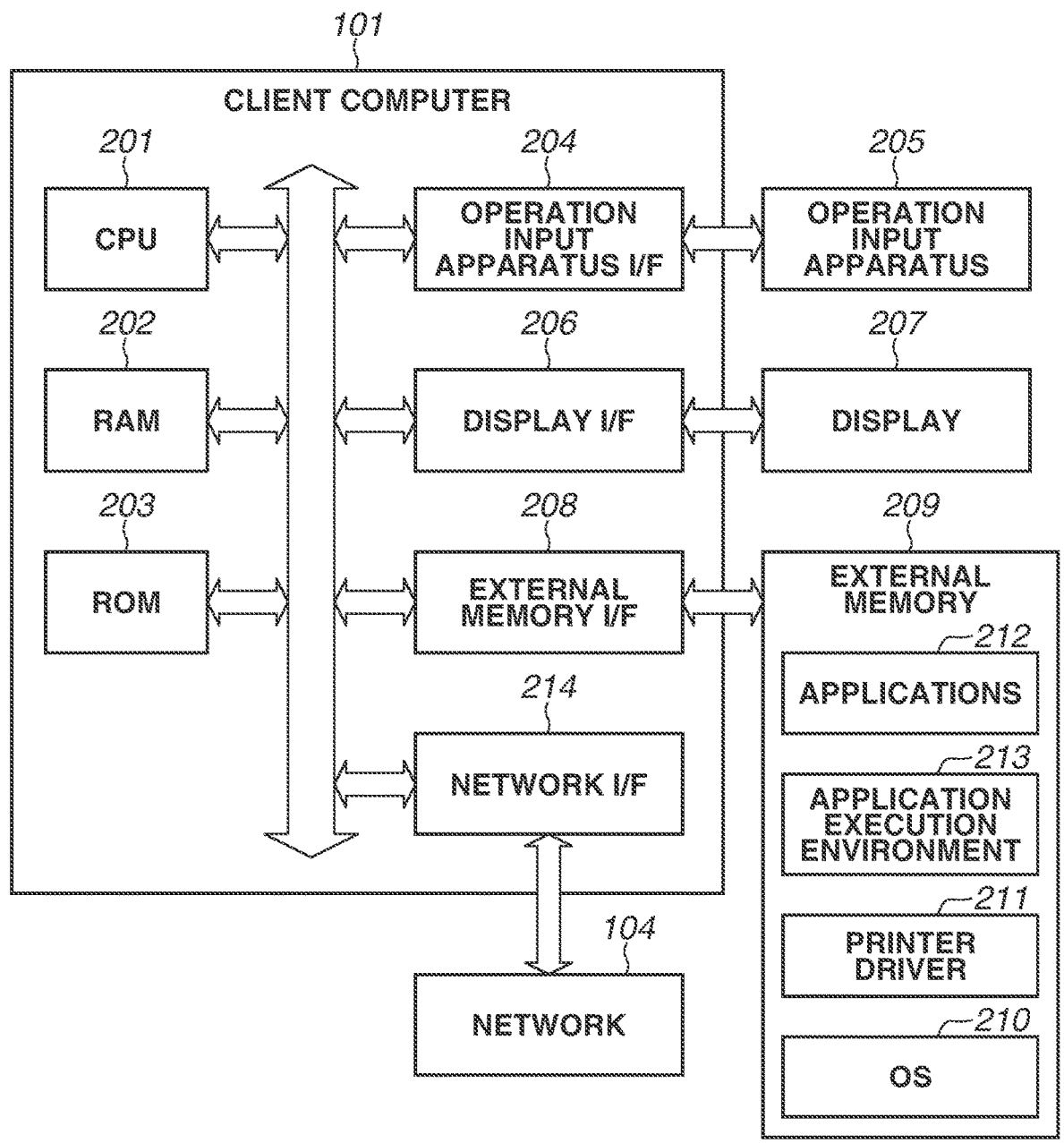
FIG. 2 is a block diagram illustrating a hardware configuration of a client computer.

FIG. 2 is a block diagram illustrating a hardware configuration of the client computer 101 illustrated in FIG. 1. The client computer 101 includes a central processing unit (CPU) 201, a random access memory (RAM) 202, an external memory 209, and a read only memory (ROM) 203.

A control unit including the CPU 201 controls operation of the entire client computer 101. The CPU 201 loads a program stored in the ROM 203 or the external memory 209 into the RAM 202 and then executes the program to perform various control operations. More specifically, the CPU 201 controls a user interface (UI) screen, generates print data, and transmits print data. The ROM 203 stores a control program and a boot program that can be executed by the CPU 201. The RAM 202 is a main memory of the CPU 201 and is used as a work area or a temporary storage area for loading various programs. The external memory 209 connected to the control unit via an external memory interface (I/F) 208 stores an OS 210, applications 212, an application execution environment 213, and a printer driver 211.

In the present exemplary embodiment, while the external memory 209 is assumed to be an auxiliary storage unit such as a hard disk drive (HDD), a nonvolatile memory such as a solid state drive (SSD) is also applicable instead of the HDD. The hardware components including the CPU 201, the ROM 203, the RAM 202, and the external memory 209 constitute what is called a computer.

An operation input apparatus I/F 204 is an interface for controlling an operation input apparatus 205 such as a keyboard, a pointing device (mouse), or a touch input device. The operation input apparatus 205 functions as a reception unit for receiving an operation from the user. A display I/F 206 controls screen display on a display 207. The display 207 functions as a display unit for displaying information to the user.

The control unit is connected to the network 104 via a network I/F 214. The network I/F 214 transmits print data to a printer on the network 104 and receives an expansion application and a printer driver from various servers on the network 104. Examples of data communications with an external terminal on the network 104 include wireless communications conforming to Institute of Electrical and Electronics Engineers (IEEE) 802.11 series, mobile communications system such as Long Term Evolution (LTE) and 5th Generation (5G), and wired communications via a LAN cable.

Figure 3:
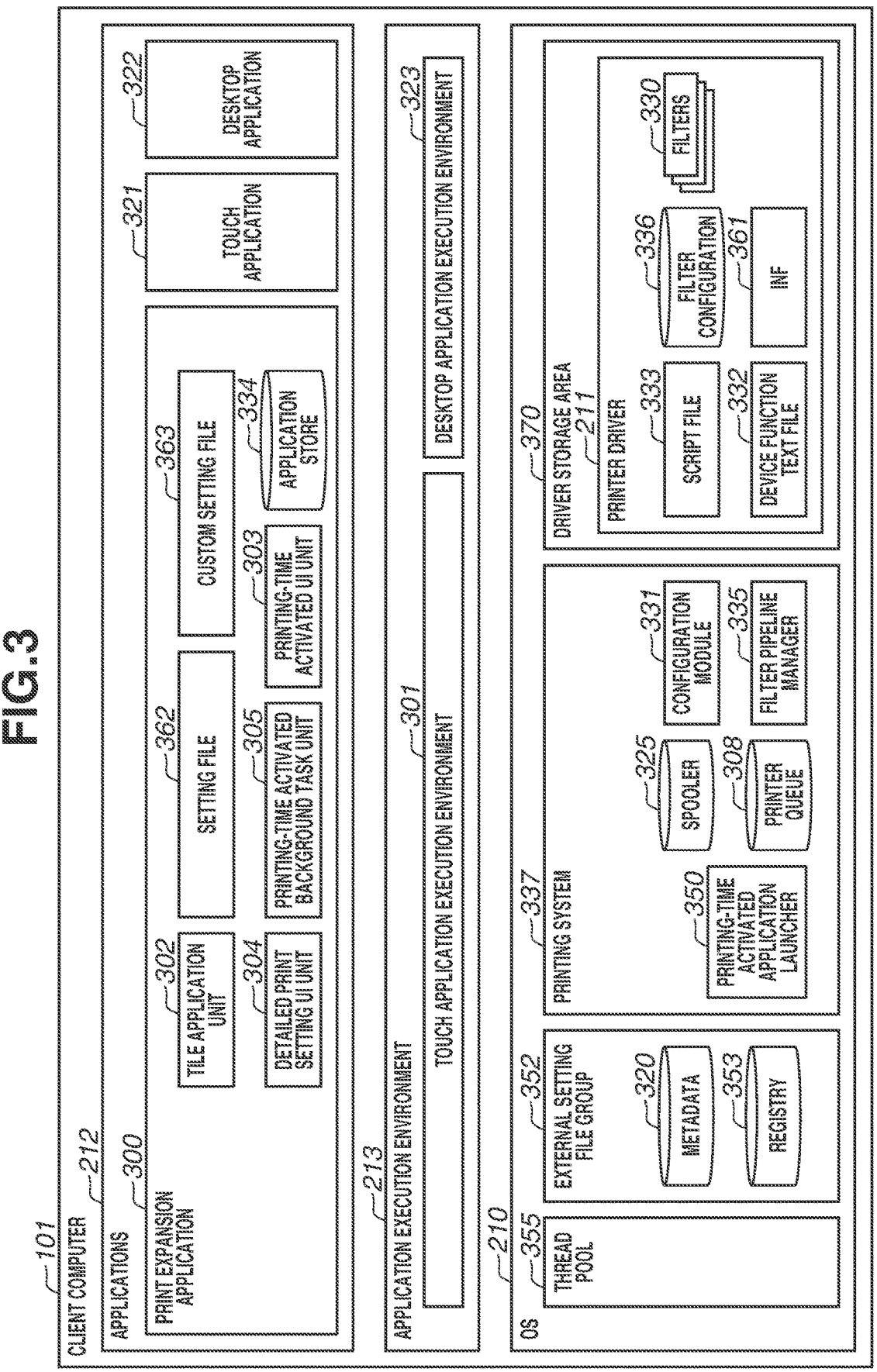
FIG. 3 is a block diagram illustrating a software configuration of the client computer.

Subsequently, an example of a software configuration of the client computer 101 will be described with reference to FIG. 3. First, software operating in the client computer 101 will be described. The software in the client computer 101 is composed of three different layers: the OS 210, the application execution environment 213, and the applications 212.

Each component constituting the OS 210 will be described. The OS 210 includes a printing system 337, the printer driver 211, an external setting file group 352, and a thread pool 355.

The external setting file group 352 will be described. Metadata 320 included in the external setting file group 352 has a print expansion application identifier of a print expansion application 300 and a Hardware Identifier (HWID) of a printer queue 308 of the printer driver 211. The metadata 320 has a role of associating these identifiers.

However, the metadata 320 does not associate the printer driver 211 from Microsoft (registered trademark) with the print expansion application 300.

A registry 353 is an area where a group of settings of the OS 210 are described. The registry 353 enables describing values by using a key and value method and describing settings for each printer queue. The registry 353 registers a policy setting indicating whether to enable or disable activation of a background task by a printing-time activated application launcher 350, and the identifier of the print expansion application 300 associated with the printer driver 211. The settings registered in the registry 353 can be changed via a setting screen of the OS 210.

Components of the printing system 337 will be described. The printer queue 308 is an area for temporarily storing a print job when performing printing by using a printer existing on the network 104, and a plurality of the printer queues 308 can be provided. In the present exemplary embodiment, the printer queues corresponding to the printer 102 and the printer 103 are generated.

A spooler 325 is a module that temporarily stores and manages an Extensible Markup Language (XML) Paper Specification (XPS) file that is print target data printed from any one of the applications 212. The XPS file stored in the spooler 325 is converted into PDL via a filter pipeline manager 335 and is transmitted to the printer A 102 via the spooler 325.

The filter pipeline manager 335 is a module that loads one or more filters 330 and converts the XPS file into a PDL file. The filter pipeline manager 335 is configured as part of a printing architecture (also referred to as a printing system) provided by the OS 210. The OS 210 reads the one or more filters 330, which are one of components of the printer driver 211, based on a definition of a filter configuration 336, and generates a PDL file by using the one or more filters 330. Examples of usable PDLs include Printer Control Language (PCL) and Portable Document Format (PDF).

A configuration module 331 generates and changes Print-Ticket (also referred to as a print ticket). The module 331 has a prohibition function for preventing uncombinable settings from being made. The configuration module manages PrintCapabilities, which is capability information about a printer.

A detailed print setting UI unit 304, a printing-time activated background task unit 305, and a printing-time activated UI unit 303 of the print expansion application 300 can call an Application Program Interface (API) provided by the configuration module 331. By calling the API, each of the units can acquire PrintTicket and PrintCapabilities in an XML format.

The printer driver 211 provides the OS 210 with a device function text file 332 describing prohibition rules and device functions, and a script file 333. Operations of the configuration module 331 are customized based on the files 332 and 333.

The printing-time activated application launcher 350 is a module that controls execution of a background task provided by the printing-time activated background task unit 305 and the like. When the OS 210 detects that a print start instruction is input by the user and performs printing, the launcher 350 activates the printing-time activated background task unit 305. When a setting for disabling the activation of a background task is stored in the registry 353, the OS 210 prevents the execution of a background task.

The printer driver 211 includes the filters 330, the filter configuration 336, the script file 333, the device function text file 332, and an INF file 361. The printer driver 211 is stored in a driver storage area 370. The filters 330, which are called by the filter pipeline manager 335, have a function of converting an input XPS file into a PDL file and outputting the file. The filter configuration 336 is a definition file referenced by the filter pipeline manager 335, and describes an order of calling the one or more filters 330. The script file 333 and the device function text file 332, which are called by the configuration module 331, enable customizing the operation of the configuration module 331. The INF file 361 is a text file that describes setting information for installing the printer driver 211.

The thread pool 355 is a module that stores a thread to be used at the time of execution of various applications 212 and a group of modules in the OS 210.

The application execution environment 213 includes a desktop application execution environment 323 and a touch application execution environment 301.

The touch application execution environment 301 is an execution environment for executing a touch application 321 and the print expansion application 300 that operate on the OS 210 and are kinds of the applications 212 (described below). The execution environment 301 is an execution environment for operating an expansion application distributed from the distribution server 105, and controls execution of the expansion application.

The desktop application execution environment 323 is an execution environment for executing a desktop application 322, which is a kind of the applications 212 (described below). The desktop application execution environment 323 controls execution of an application that can be executed from the desktop.

The applications 212 include three different applications; the touch application 321, the print expansion application 300, and the desktop application 322. The touch application 321 operates in the touch application execution environment 301. The touch application 321 is downloaded via an application distribution system publicly available on the Internet, and then installed in the client computer 101. In the touch application 321, a group of required modules is packaged and signed to restrict calling of the API in the OS 210.

The print expansion application 300 is a kind of the touch application 321, and operates in the touch application execution environment 301 in the same way as the touch application 321. The OS 210 acquires the print expansion application 300 from the application distribution system via the Internet. The print expansion application 300 according to the present exemplary embodiment has a printing-time UI display function that displays an originally customized UI at the time of printing. The print expansion application 300 can be associated with the printer driver 211 provided by a printer vendor via the metadata 320. In a case where the print expansion application 300 is associated with a common printer driver commonly used by printers provided by a plurality of printer vendors, an association is made by using the INF file 361 and the registry 353. The association will be described below with reference to FIG. 4.

The print expansion application 300 includes a tile application unit 302, the detailed print setting UI unit 304, the printing-time activated background task unit 305, and the printing-time activated UI unit 303.

The tile application unit 302 is a UI unit to be executed upon reception of a user operation for activating the print expansion application 300, and provides a function such as displaying a status of a registered printer.

The detailed print setting UI unit 304 is executed upon reception of a detailed print setting event issued by the OS 210. The detailed print setting UI unit 304 generates and displays a print setting UI based on PrintTicket and PrintCapabilities acquired from the configuration module 331 via the API. Based on a user operation, the UI unit 304 appropriately changes the setting of PrintTicket and returns the setting to the configuration module 331.

The printing-time activated background task unit 305 is a component corresponding to a background task to be executed upon issuance of a print event. A task provided by the task unit 305 has a limited survival time, and is forcibly terminated by the OS 210 when a predetermined time period has elapsed.

The printing-time activated background task unit 305 can acquire, read, and write PrintTicket via the API of the configuration module 331. The printing-time activated background task unit 305 is predetermined to determine whether to activate the printing-time activated UI unit 303 by a background task, and when necessary, requests the OS 210 to activate the printing-time activated UI unit 303, which is a foreground task component. The printing-time activated background task unit 305 can transmit and receive a value to and from the printing-time activated UI unit 303 by writing and reading a changed value to and from an application store 334. When the printing-time activated background task unit 305 determines not to activate the printing-time activated UI unit 303, the launcher 350 generates print data without activating the print expansion application 300.

In addition, the printing-time activated UI unit 303 activated by the background task can edit XPS or PrintTicket to be print target data and return the data to the OS 210.

When a background task requests the OS 210 to activate the printing-time activated UI unit 303, the OS 210 activates the printing-time activated UI unit 303. The printing-time activated UI unit 303 can not only acquire and change settings of the PrintTicket and PrintCapabilities but also acquire the XPS file to be the print target data. To change the XPS file, it is necessary that the printing-time activated UI unit 303 once pass the edited XPS file to the printing-time activated background task unit 305 via the application store 334 and that the task unit 305 return the edited XPS file to the OS 210. In the present exemplary embodiment, the printing-time activated UI unit 303 displays a UI for checking printing and a UI for prompting the user to input settings not input yet.

A setting file 362 describes settings of the print expansion application 300, such as the print expansion application identifier uniquely indicating the print expansion application 300 and a custom setting file to be used.

A custom setting file 363 describes the settings of services available for the printer driver 211 by the print expansion application 300.

The common printer driver will be described. Since installing a printer driver is troublesome for a user who wants to simply perform printing, the common printer driver is used to save this trouble. The common printer driver is commonly applicable to printers supporting Mopria (registered trademark) that enables printing, for example, by using Internet Printing Protocol (IPP). In this case, the use of the common printer driver enables the user of a printer supporting Mopria (registered trademark) to simply perform printing without installing a printer driver from a printer vendor. In addition, since the common printer driver is not dependent on a printer vendor, the common printer driver can be used on a printer of any printer vendor in a similar way.

Figure 4:
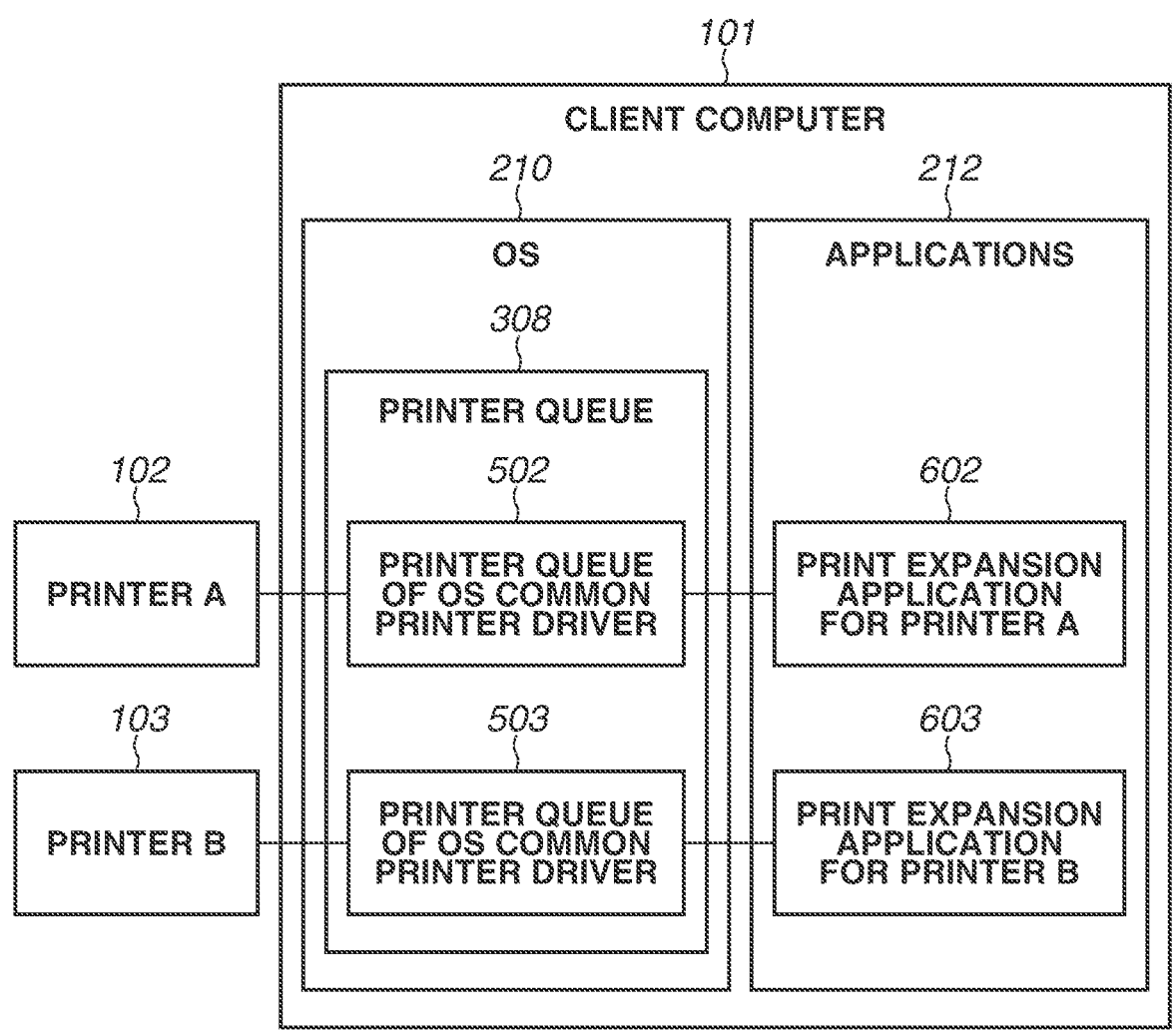
FIG. 4 is a diagram illustrating a relationship between printers, printer queues, and print expansion applications.

A relationship between the common printer driver and the print expansion application will be described. FIG. 4 illustrates a relationship between a printer queue 502 of the common printer driver and the print expansion application 300 for the printer A 102, and a relationship between a printer queue 503 of the common printer driver and the print expansion application 300 for the printer B 103. The printer queue 502 of the common printer driver corresponds to the printer A 102, and the printer queue 503 of the common printer driver corresponds to the printer B 103. Although the printer A 102 and the printer B 103 are different entities, the common printer driver generates print data and issues a print job for each of the printers. The common printer driver acquires a certain degree of capability information from the printer A 102 and the printer B 103, and is capable of making print settings based on the capability of each printer. However, the common printer driver provides a small number of types of print settings that can be made to support a plurality of printers of a plurality of vendors. This is complemented by the print expansion application 300. A print expansion application 602 for a printer A is the print expansion application 300 dedicated for the printer A, and a print expansion application 603 for printer B is the print expansion application 300 dedicated for the printer B 103. The print expansion application 300 is generated by a printer vendor. Whereas the common printer driver is software not dependent on the printer type, the print expansion application 300 enables making detailed print settings for each printer. A procedure for associating the print expansion application 300 with the common printer driver based on the printer type as illustrated in FIG. 4 is necessary. A flowchart illustrating the procedure for associating will be described below with reference to FIG. 5. More specifically, for example, "associating" refers to registering, of the identifier of the print expansion application 300 to be associated with the printer driver 211 in the registry 353 by the OS 210.

The identifier of the print expansion application 300 to be associated with the identifier of the printer driver 211 can be registered in association therewith not only in the registry 353 but also in a predetermined storage area or a database. The registration can be made by using a one-to-one correspondence table or a plurality of expansion applications can be registered in association with the printer driver 211.

This enables the OS 21 to display the detail print setting UI unit and the printing-time activated UI unit 303 of the associated print expansion application 300 when using the printer driver 211.

Figure 5:
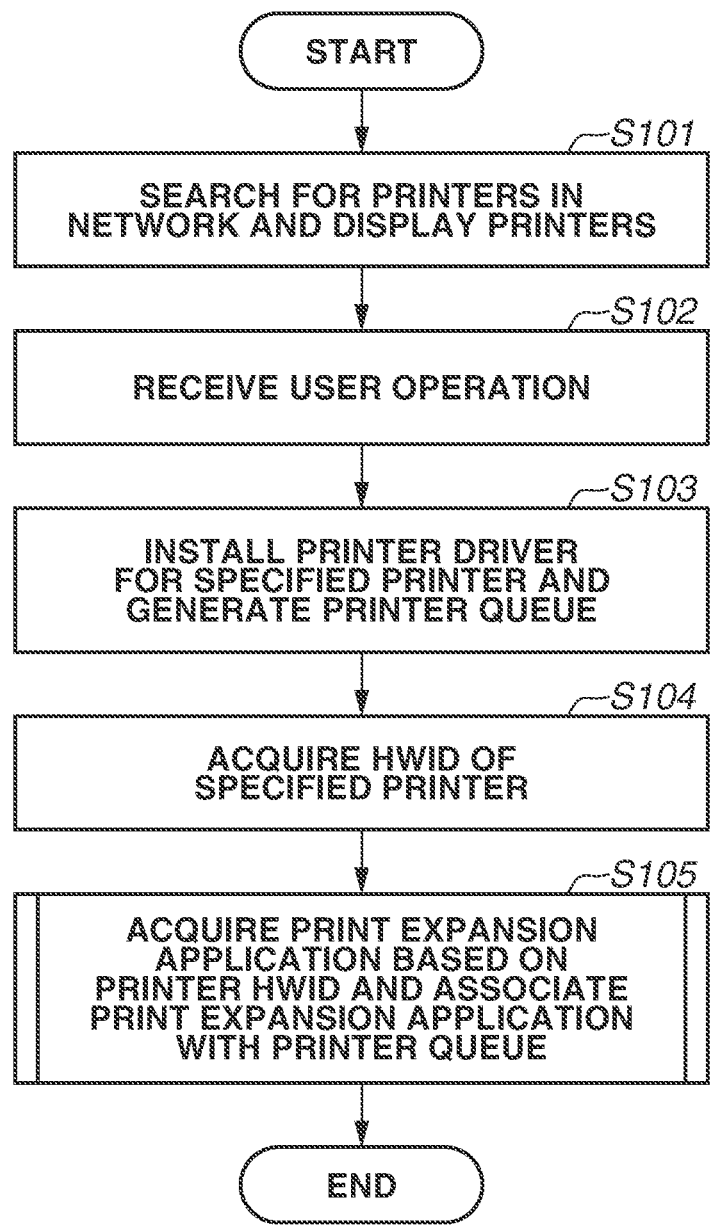
FIG. 5 is a flowchart illustrating an association between printer queue generation and a print expansion application.

FIG. 5 is a flowchart illustrating the procedure for associating the print expansion application with the common printer driver. FIG. 5 illustrates processing by the OS 210 of the client computer 101. The processing by the OS 210 described herein is executed by the CPU 201.

When a printer is introduced to the OS 210, then in step S101, the OS 210 searches for printers in the network and displays the printers to the user. Examples of the printer being introduced to the OS 210 are when a new printer is found on a network or a local interface and a predetermined event occurs, or when printer introduction is started by a user instruction.

In step S102, the OS 210 receives a user input for specifying a printer, among all the searched printers, for which the printer driver 211 is to be installed. In step S103, the OS 210 installs the printer driver 211 that enables printing on the printer specified by the user, and generates the printer queue 308. In step S104, the OS 210 acquires, via a network, the Hardware Identifier (HWID) predetermined for each printer model from the printer (real device) specified by the user. In step S105, the OS 210 acquires the print expansion application 300 based on the HWID of the printer, and associates the print expansion application 300 with the printer queue 308 generated in step S103. Specific processing in step S105 will be described below with reference to FIGS. 6 and 7. The printer driver is associated with the print expansion application 300 in this way.

Figure 6:
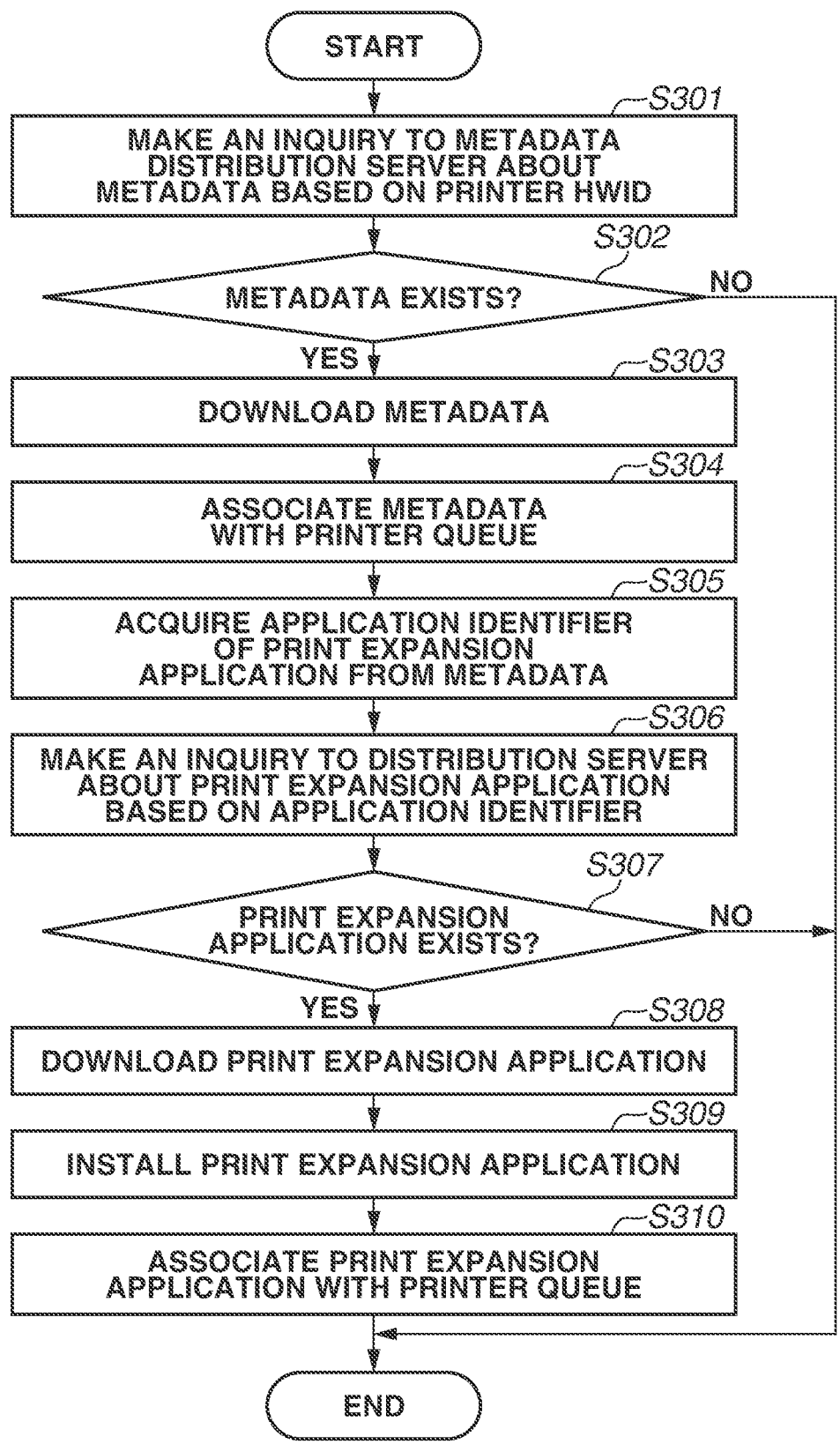
FIG. 6 is a flowchart illustrating a conventional association between a printer driver and a print expansion application.

FIG. 6 is a flowchart illustrating processing by the OS 210 as a comparative example with regard to the processing by the OS 210 in step S105. The processing by the OS 210 described herein is also executed by the CPU 201. In step S301, the OS 210 makes an inquiry to the metadata distribution server 108 about whether a corresponding metadata 320 exists based on the printer HWID. In step S302, the OS 210 determines whether the corresponding metadata 320 exists. If the corresponding metadata 320 does not exist, the processing ends. If the metadata 320 corresponding to the HWID acquired in S104 exists, in step S303, the OS 210 downloads the metadata 320. In step S304, the OS 210 associates the metadata 320 with the printer queue 308. Then, in step S305, the OS 210 references the downloaded metadata 320 and acquires the application identifier of the print expansion application 300 from the metadata 320. In step S306, the OS 210 makes an inquiry to the expansion application distribution server 107 about the print expansion application 300 based on the application identifier. In step S307, the OS 210 determines whether the print expansion application 300 exists. If the OS 210 determines that the print expansion application 300 does not exist, the processing ends. If the OS 210 determines that the print expansion application 300 exists, in step S308, the OS 210 downloads the print expansion application 300. In step S309, the OS 210 installs the downloaded print expansion application 300. Further, in step S310, the OS 210 associates the installed print expansion application 300 with the printer queue 308. The OS 210 associates the print expansion application 300 with the printer queue 308 via the metadata 320 in this way.

Figure 7:
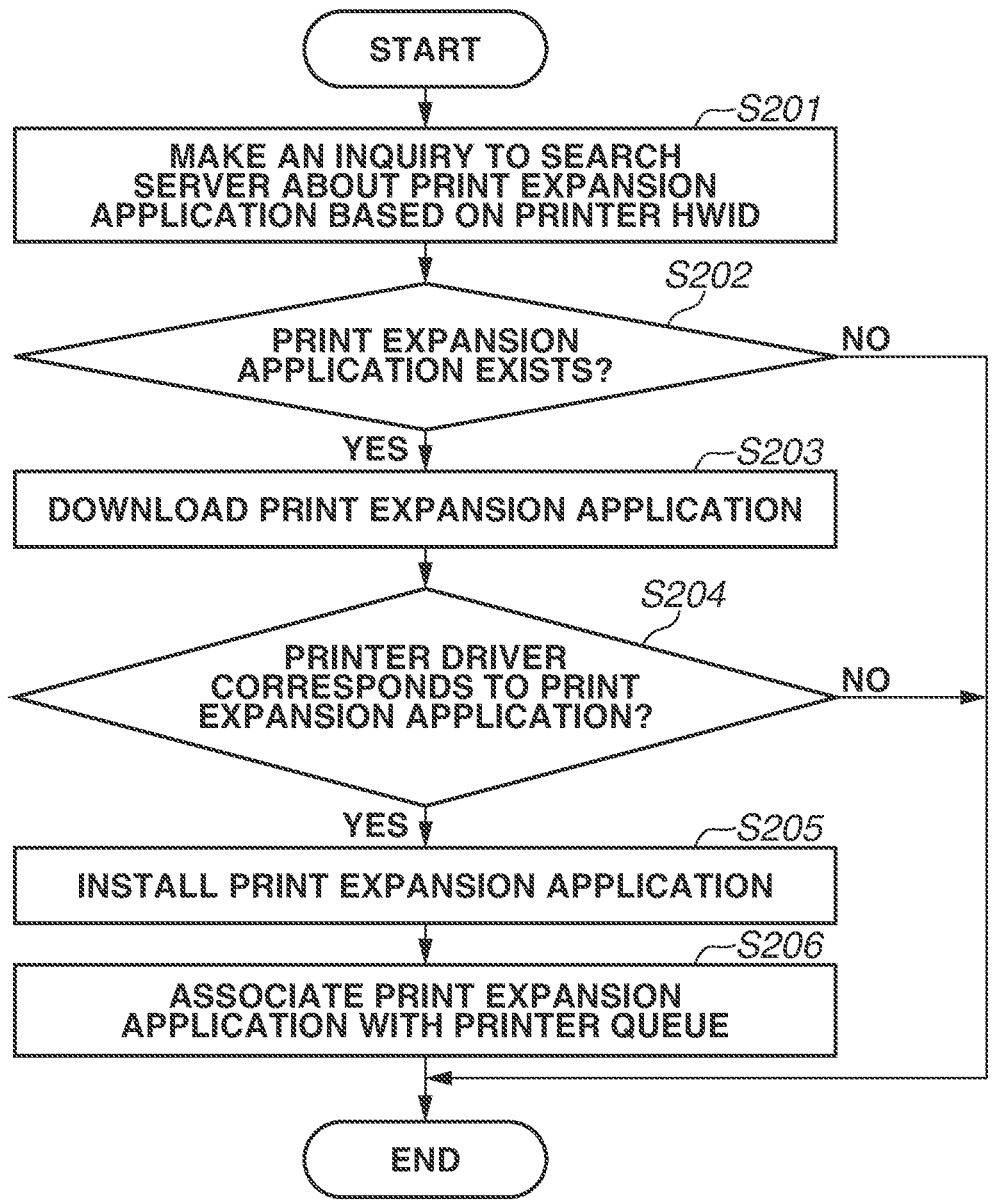
FIG. 7 is a flowchart illustrating an association between a printer driver and a print expansion application according to an exemplary embodiment.

FIG. 7 is a flowchart illustrating processing by the OS 210 according to the present exemplary embodiment with regard to the processing by the OS 210 in step S105 illustrated in FIG. 5. The processing by the OS 210 described herein is also loaded into the RAM 202 and then executed by the CPU 201. First, in step S201, the OS 210 makes an inquiry to the search server 106 about whether a corresponding print expansion application 300 exists based on the printer HWID acquired in step S104. In step S202, the OS 210 determines whether the print expansion application 300 corresponding to the HWID exists. If the OS 210 determines that the print expansion application 300 corresponding to the HWID does not exist, the processing ends. If the OS 210 determines that the print expansion application 300 corresponding to the HWID exists in step S202, in step S203, the OS 210 downloads the print expansion application 300. Next, in step S204, the OS 210 determines whether the downloaded print expansion application 300 corresponds to the printer driver 211. More specifically, the OS 201 transmits the printer HWID acquired in step S104 to the search server 106. As a response to this, the OS 210 receives a list of print expansion applications 300 corresponding to the HWID. Accordingly, the OS 210 determines whether the application corresponding to the HWID exists in step S202.

FIG. 14 illustrates details of determination made in step S204. First, in step S801, the OS 210 acquires corresponding driver identifiers from the downloaded print expansion application 300. Each of the print expansion applications 300 stores the identifiers of the corresponding printer drivers. This prevents the print expansion application 300 from being associated with an unexpected printer driver. Next, in step S802, the OS 210 determines whether a driver identifier of the printer queue 308 exists among the corresponding driver identifiers. If the OS 210 determines that the driver identifier thereof exists in step S802, the OS 210 determines that the print expansion application 300 is applicable to the printer queue 308. If the OS 210 determines that the driver identifier thereof does not exist in step S802, the OS 210 determines that the print expansion application 300 is not applicable to the printer queue 308.

If the OS 210 determines that the print expansion application 300 is not applicable as a result of determination in the processing illustrated in FIG. 14 (NO in step S204), the OS 210 does not perform the association, and ends the processing. On the other hand, if the OS 210 determines that the print expansion application 300 is applicable (YES in step S204), in step S205, the OS 210 installs the downloaded print expansion application 300. Then, in step S206, the OS 210 associates the installed print expansion application 300 with the printer queue 308. The OS 210 directly associates the print expansion application 300 with the printer queue 308 in this way, without using the metadata 320. This enables the OS 210 to associate even the printer queue 308 of the common printer driver from Microsoft (registered trademark) with the print expansion application 300 from a printer vendor.

When performing the association, the OS 210 can separately use the processing illustrated in FIG. 6 and the processing illustrated in FIG. 7. For example, the OS 210 may determine whether to perform the association of the print expansion application 300 by using the metadata 320 or directly perform the association of the print expansion application 300 depending on whether the corresponding metadata 320 exists in the metadata distribution server 108. Alternatively, if the printer driver subjected to the association is a printer driver from a vendor, the OS 210 may perform the processing illustrated in FIG. 6, and if the printer driver subjected to the association is a common printer driver, the OS 210 may perform the processing illustrated in FIG. 7. In this way, it is possible to support the association with the common printer driver while utilizing an asset of the conventional metadata 320.

A processing procedure performed by the search server 106 will be described with reference to FIG. 8. The search server can have a hardware configuration similar to that illustrated in FIG. 2. More specifically, this processing is performed by the search server 106 when the OS 210 of the client computer 101 makes an inquiry about the print expansion application 300 corresponding to the HWID in step S201 illustrated in FIG. 7. The processing by the search server 106 described herein is executed by a CPU in the search server 106. First, in step S401, the search server 106 receives a request for the print expansion application 300 based on the HWID from any client computer 101. In step S402, the search server 106 acquires a correspondence table of the HWID and the print expansion application stored therein.

The correspondence table of the HWID and the print expansion application will be described with reference to FIG. 10. The search server 106 stores the correspondence table of the printer HWID and the print expansion application illustrated in FIG. 10. A printer HWID 1001 is an ID unique to each printer model, and different printer models are assigned different IDs. A print expansion application name 1002 is the name of the print expansion application 300 that is easy to be identified by general users. An application identifier (AppID) 1003 is managed by the distribution server 105. The distribution server 105 can identify the corresponding print expansion application 300 from among all expansion applications by using the AppID 1003. The correspondence table illustrated in FIG. 10 may be updated each time a new print expansion application 300 is developed and registered. For example, the correspondence table for an update can be transmitted from an external apparatus to the distribution server 105 via a network. An old correspondence table may be updated to a new correspondence table by the distribution server 105.

When registering one print expansion application 300, a printer vendor can register one HWID of a printer to be associated with the print expansion application 300 at the same time. Further, the one HWID of the printer may be provided with a plurality of application identifiers. In either case, registered contents are added to the correspondence table illustrated in FIG. 10. In the example illustrated in FIG. 10, one application identifier is registered for each printer. For example, PrinterAAA may appear twice in the column 1001. This means that a plurality of expansion printer applications is provided to one printer.

When the search server 106 acquires the correspondence table, in step S403, the search server 106 determines whether the print expansion application 300 corresponding to the HWID acquired from the client computer 101 exists in the correspondence table.

For example, w % ben PrinterAAA is acquired as the printer HWID, the search server 106 searches through the table illustrated in FIG. 10 and determines that the application identifier corresponding to PrinterAAA is AAA01. Then, the search server 106 can notify a client of AAA01 and the print expansion application name PrintAppAAA. In principle, the client computer acquires the HWID from the printer.

Figure 8:
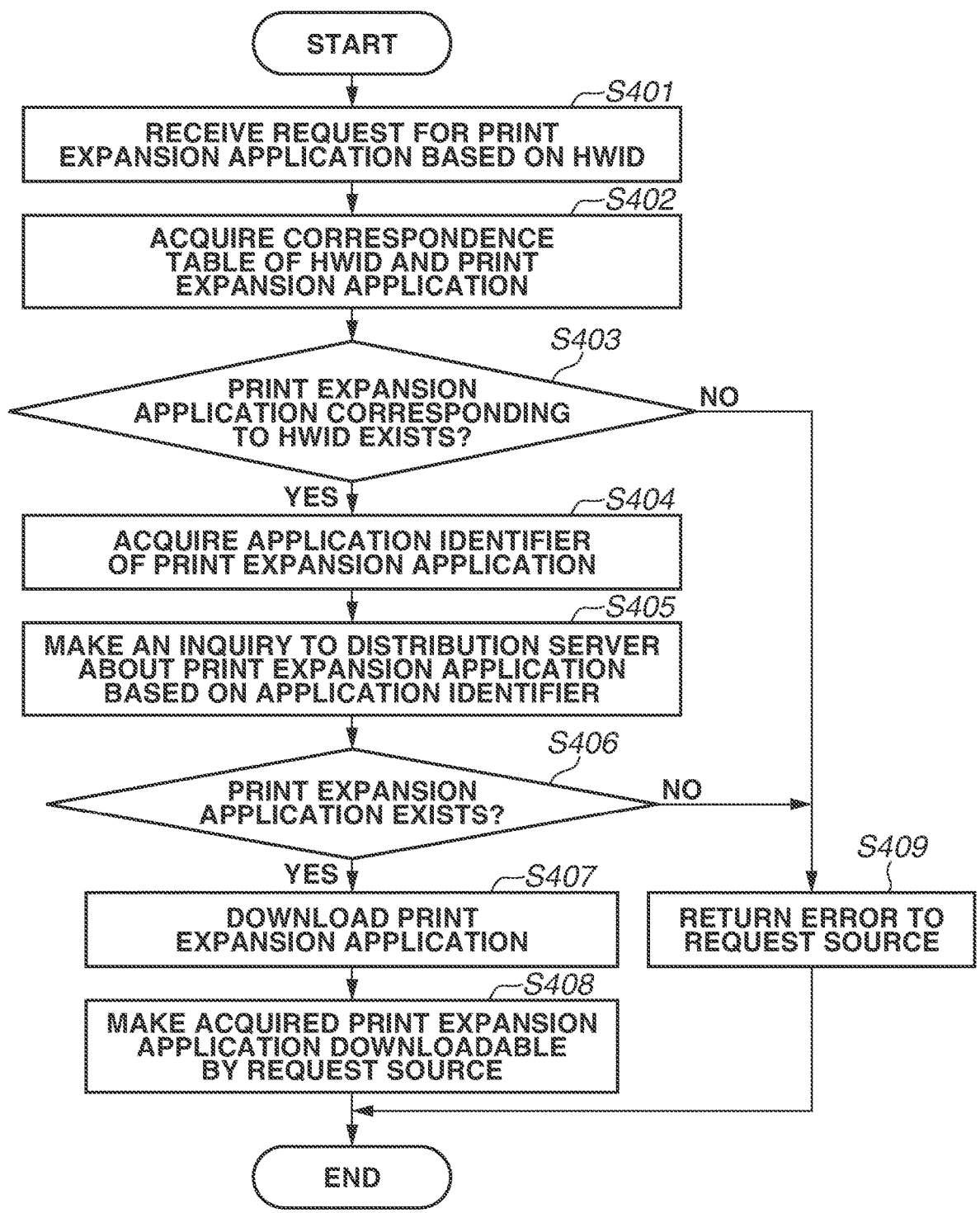
FIG. 8 is a flowchart illustrating processing performed by an expansion application search server.

Referring back to the description of FIG. 8, if it is determined that the print expansion application 300 corresponding to the HWID does not exist, the following processing is performed. In step S409, the search server 106 returns an error to the client computer 101 that is the request source. Then, the processing ends. If it is determined that the print expansion application 300 corresponding to the HWID exists, in step S404, the search server 106 acquires the application identifier of the print expansion application 300. In step S405, the search server 106 makes an inquiry to the distribution server 105 about the print expansion application 300 based on the application identifier. In step S406, the search server 106 determines whether the target print expansion application 300 exists in the distribution server 105. If it is determined that the target print expansion application 300 does not exist in step S406, in step S409, the search server 106 returns an error to the client computer 101 that is the request source. Then, the processing ends. If it is determined that the target print expansion application 300 exists in step S406, in step S407, the search server 106 downloads the print expansion application 300. Then, in step S408, the search server 106 makes the acquired print expansion application 300 downloadable by the client computer 101 that is the request source. Then, in step S408, the search server 106 notifies the client computer of a list of downloadable print expansion applications 300. The plurality of print expansion applications may be described in the list. In step S308, the client computer 101 may automatically determine that the print expansion application 300 exists in response to this notification, and then download the print expansion application 300.

The search server 106 performs the processing illustrated in FIG. 8. The processing enables the distribution server 105 to provide the appropriate print expansion application 300 to each of the common printer driver and the printer drivers from printer vendors without changing the operation. To simplify the description, the method in which the search server 106 downloads the actual print expansion application 300 in advance in step S407 has been described. As a modification, a method may be used in which, instead of downloading the print expansion application 300 in step S407, the search server 106 makes the print expansion application 300 downloadable from the expansion application distribution server after reception of an acquisition request from the client computer 101.

Figure 9:
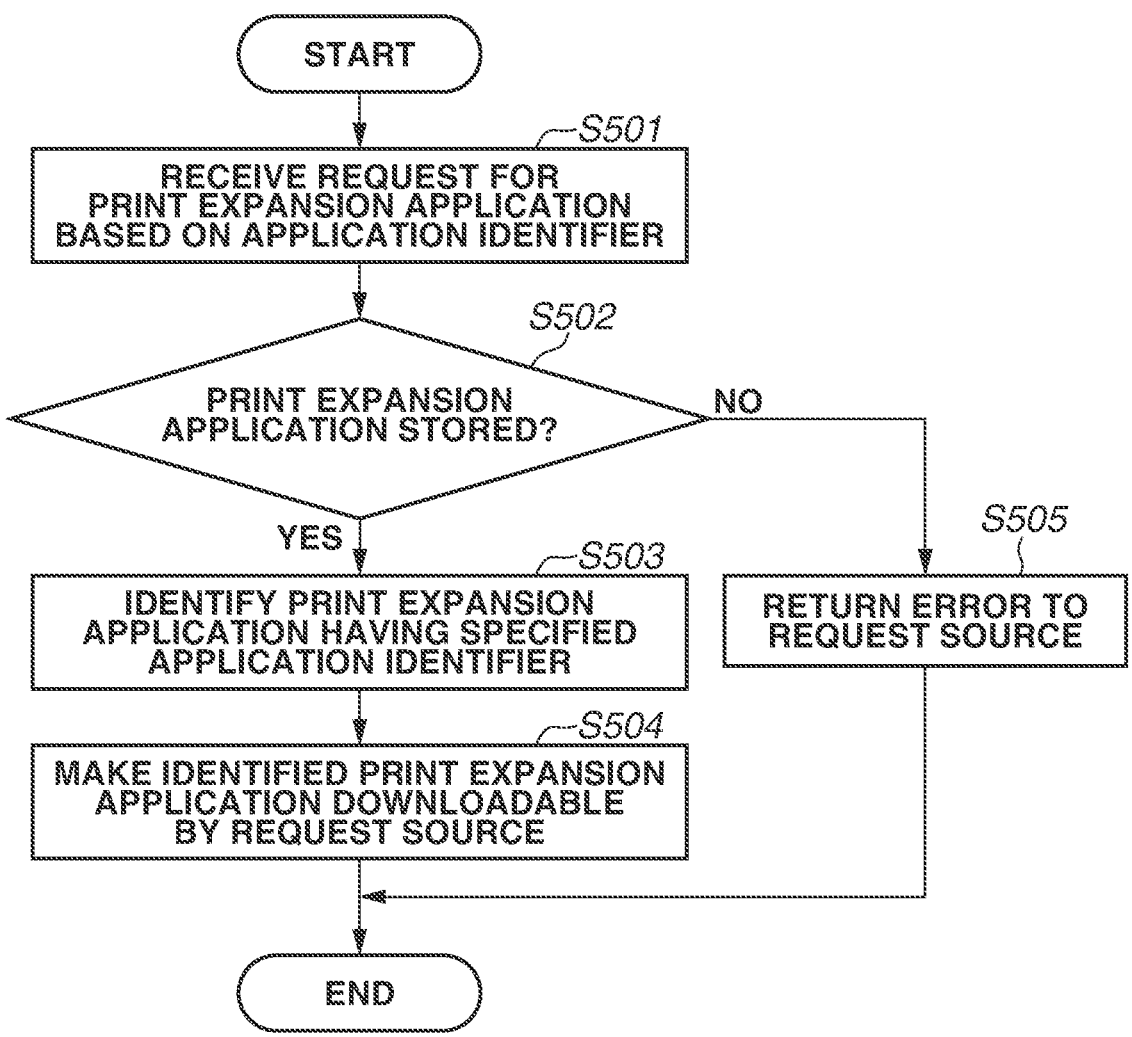
FIG. 9 is a flowchart illustrating processing performed by an expansion application distribution server.

A processing procedure performed by the distribution server 105 will be described with reference to FIG. 9. More specifically, this processing is performed by the distribution server 105 when the client computer 101 makes an inquiry to the distribution server 105 in step S306 illustrated in FIG. 6 or when the search server 106 makes an inquiry to the distribution server 105 in step S405 illustrated in FIG. 8. The processing by the distribution server 105 described herein is executed by a CPU (not illustrated) in the distribution server 105. In step S501, the distribution server 105 receives a request for the print expansion application based on the application identifier from any client computer 101 or the search server 106. Upon reception of the request, in step S502, the distribution server 105 determines whether the print expansion application 300 of the application identifier is stored. If the print expansion application 300 thereof is not stored, in step S505, the distribution server 105 returns an error to the client computer 101 that is the request source or the search server 106, and ends the processing. If the print expansion application 300 thereof is stored, in step S503, the distribution server 105 identifies the print expansion application 300 having the specified application identifier. Then, in step S504, the distribution server 105 makes the identified print expansion application 300 downloadable by the request source. The distribution server 105 may perform the same processing in this way regardless of the request source. When the print expansion application 300 is downloadable, the expansion application becomes downloadable in response to a request from the client computer 101.

The first exemplary embodiment of the present invention has been described with reference to the drawings. The system according to the present invention having the above-described configuration enables associating the appropriate print expansion application 300 corresponding to the HWID with the common printer driver.

Second Exemplary Embodiment

Unless otherwise noted, identical apparatuses and functions are indicated by the same reference numerals. The second exemplary embodiment will be described below centering on differences from the first exemplary embodiment. In the first exemplary embodiment, the example has been described in which the search server 106 performs the processing of searching for the print expansion application 300 corresponding to the HWID. However, the search server 106 is not necessarily required. More specifically, the processing can be implemented by the distribution server 105 performing the function of the search server 106, which will be described as the second exemplary embodiment. In other words, the distribution servers 105 and 106 may be integrated.

Figure 11:
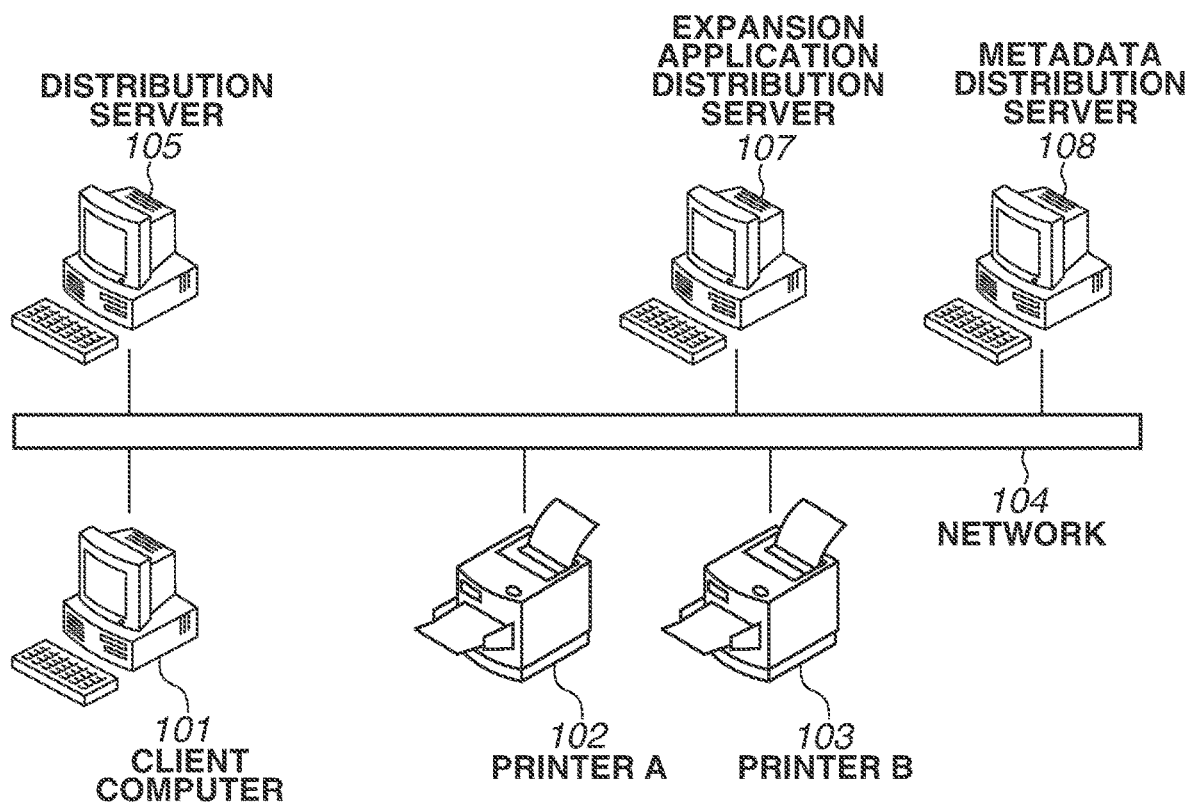
FIG. 11 is a diagram illustrating an example of a printing system according to a second exemplary embodiment.

FIG. 11 illustrates a configuration of a printing system according to the second exemplary embodiment. The second exemplary embodiment has almost the same configuration as that of the first exemplary embodiment illustrated in FIG. 1 but differs from the first exemplary embodiment in that the search server 106 does not exist. Each component has been described in detail above, and redundant descriptions thereof will be omitted. The descriptions of FIGS. 2, 5, and 7 according to the first exemplary embodiment are also applicable to the second exemplary embodiment, and redundant descriptions thereof will be omitted.

FIG. 12 is a flowchart illustrating in more detail the processing by the OS 210 of the client computer 101 in step S105 illustrated in FIG. 5. The processing by the OS 210 described herein is loaded into the RAM 202 and then executed by the CPU 201. The flowchart illustrated in FIG. 12 differs from the flowchart illustrated in FIG. 7 in step S601. In step S601, the OS 210 makes an inquiry to the distribution server 105, not the search server 106, about whether the print expansion application 300 exists based on the printer HWID. Other processing (steps S602 to S606) is the same as the processing according to the first exemplary embodiment (steps S202 to S206), and redundant descriptions thereof will be omitted. If the OS 210 of the client computer 101 performs such processing, it is not necessary to separately provide the search server 106 in the system.

FIG. 12 is a flowchart illustrating a procedure performed by the distribution server 105 when the client computer 101 makes an inquiry to the distribution server 105 in step S306 illustrated in FIG. 6 and step S601 illustrated in FIG. 12. The processing by the distribution server 105 described herein is executed by a CPU (not illustrated) in the distribution server 105. First, in step S701, the distribution server 105 receives a request for the print expansion application 300 from any client computer 101. Next, in step S702, the distribution server 105 determines whether the request is a request for the print expansion application based on the application identifier. If the request is the request for the print expansion application based on the application identifier, in step S703, the distribution server 105 identifies the print expansion application 300 having the specified application identifier from among the print expansion applications 300 stored in the distribution server 105. In other cases, next, in step S704, the distribution server 105 determines whether the request is a request for the print expansion application 300 based on the HWID. If the request is the request for the print expansion application based on the HWID, in step S705, the distribution server 105 identifies the print expansion application 300 having the specified HWID from among the print expansion applications 300 stored in the distribution server 105. Then, in step S706, the distribution server 105 determines whether the identified print expansion application 300 is stored in the distribution server 105. If the identified print expansion application 300 is stored in the distribution server 105, in step S707, the distribution server 105 makes the identified print expansion application downloadable by the client computer 101 that is the request source. If the identified print expansion application 300 is not stored in the distribution server 105, in step S708, the distribution server 105 returns an error to the client computer 101 that is the request source.

The second exemplary embodiment of the present invention has been described with reference to the drawings. The system according to the present invention having the above-described configuration enables obtaining an effect equivalent to that of the first exemplary embodiment even without the search server 106.

The client computer 101 that is an example of an information processing apparatus can be installed with the printer driver 211 that is an example of a printer driver. The client computer 101 can communicate with the distribution server 105 that is an example of a server apparatus. The client computer 101 can also communicate with the printer A 102 and the printer B 103 that are examples of image forming apparatuses. The printer driver 211 may be a common printer driver or a universal printer driver that is applicable to a plurality of printers.

The network I/F 104 receives the HWID that is an example of identification information about an image forming apparatus. The network I/F 214 transmits the HWID received via the network I/F 214 to the distribution server 105. The network I/F 214 is an example of a transmission unit and an example of a reception unit. The print expansion application 300 is an example of an expansion application.

The print expansion application 300 that is transmitted from the distribution server 105 and that corresponds to the HWID transmitted from the network I/F 214 is referred to as a program A. The CPU 201 performs processing of associating the program A with the printer driver 211. The CPU 201 is an example of an execution unit. The client computer 101 may determine whether the print expansion application 300 transmitted from the distribution server 105 is applicable to the printer driver 211.

The print expansion application 300 may be installed on condition that the print expansion application 300 is determined to be applicable to the printer driver 211.

An example of identification information about the print expansion application 300 is the application identifier. The application identifier may be transmitted to the distribution server 105, and the reception unit may receive the print expansion application 300 corresponding to the identification information from the distribution server 105. The print expansion application 300 may be acquired via different paths depending on whether or not the printer driver installed in client computer 101 is a common printer driver that can be used by both the printer A 102 and the printer B 103. The CPU 201 is an example of a control unit.

A plurality of print expansion applications can be associated with the HWID that is the printer identification information. The CPU 201 may perform processing of associating the plurality of print expansion applications corresponding to the HWID that has been transmitted with the printer driver 211.

The present invention is not limited to the above-described exemplary embodiments and can be modified and changed in diverse ways without departing from the spirit and scope of the present invention. Therefore, the following claims are appended to disclose the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an aspect of the present exemplary embodiment, the present invention has an effect of associating an expansion application capable of utilizing a function of an image forming apparatus, with a predetermined printer driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus communicable with a server apparatus, a second server apparatus, and a plurality of printers of a plurality of printer vendors, the information processing apparatus comprising:

a memory configured to store a first printer driver that is compatible with the plurality of printers; and a controller configured to:

receive identification information about the printer;

transmit the received identification information about the printer to the first server apparatus in a case that the received identification information is associated with the first printer driver;

receive a print setting application that is specified based on the identification information transmitted to the first server apparatus, wherein the print setting application is an application applicable to a printer provided by one of the plurality of printer vendors and is incompatible with one or more printers provided by the other printer vendors;

execute processing of associating the print setting application with the first printer driver;

transmit the received identification information about the printer to the second server apparatus in a case that the received identification information is associated with a second printer driver that is provided by one of the plurality of printer vendors;

receive the print setting application that is specified based on the identification information transmitted to the second server apparatus; and execute processing of associating the print setting application with the second printer driver.

2. The information processing apparatus according to claim 1, wherein the controller is further configured to:
cause the print setting application to display a print setting object for setting a print setting value.

3. The information processing apparatus according to claim 2, wherein the print setting application is used for displaying the print setting object in a situation that the first printer driver or the second printer driver is to be used for printing.

4. The information processing apparatus according claim 3, wherein the print setting application is used for setting the print setting value that is not able to be set by the first printer driver before the first printer driver is associated with the print setting application.

5. The information processing apparatus according claim 1, wherein the controller is further configured to:
generate image data; and
transmit the generated image data and the print setting value set by the print setting application.

6. The information processing apparatus according to claim 1, wherein said one of the printer vendors is a printer vendor that provided the printer.

7. The information processing apparatus according to claim 6, wherein the print setting application is provided by the printer vendor that provided the printer.

8. The information processing apparatus according to claim 1, wherein the first server apparatus is different from the second server apparatus.

9. A control method for an information processing apparatus communicable with a first server apparatus, a second server apparatus, and a plurality of printers of a plurality of printer vendor, the information processing apparatus having a memory configured to store a first printer driver that is compatible with the plurality of printers, the control method comprising:

receiving identification information about the printer;
transmitting the received identification information about the printer to the first server apparatus in a case that the received identification information is associated with the first printer driver;
receiving a print setting application that is specified based on the identification information transmitted to the first server apparatus, wherein the print setting application is an application applicable to a printer provided by one of the plurality of printer vendors and is incompatible with one or more printers provided by the other printer vendors;
execute processing of associating the print setting application with the first printer driver;
transmit the received identification information about the printer to the second server apparatus in a case that the received identification information is associated with a second printer driver that is provided by one of the plurality of printer vendors;
receive the print setting application that is specified based on the identification information transmitted to the second server apparatus; and
execute processing of associating the print setting application with the second printer driver.

10. A non-transitory computer-readable storage medium storing a control program for causing a computer to perform the control method according to claim 9.

11. The control method according to claim 9, further comprising, causing the print setting application to display a print setting object for setting a print setting value.

12. The control method according to claim 9, wherein the print setting application is used for displaying the print setting object in a situation that the first printer driver or the second printer driver is to be used for printing.

13. The control method according claim 12, wherein the print setting application is used for setting the print setting value that is not able to be set by the first printer driver before the first printer driver is associated with the print setting application.

14. The control method according claim 9, further comprising:
generating image data; and
transmitting the generated image data and the print setting value set by the print setting application.

15. The control method according to claim 9, wherein said one of the printer vendors is a printer vendor that provided the printer.

16. The control method according to claim 15, wherein the print setting application is provided by the printer vendor that provided the printer.

* * * * *